(12) United States Patent  (10) Patent No.: US 9,680,895 B1
Wang et al.  (45) Date of Patent: Jun. 13, 2017

(54) MEDIA CONTENT REVIEW TIMELINE (71) Applicant: IMDb.com, Inc., Seattle, WA (US)

(72) Inventors: Jue Wang, Los Angeles, CA (US);
Mustafa Safdari, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 14/726,222

(22) Filed: May 29, 2015

(51) Int. Cl.
  *G06F 15/16* (2006.01)
  *H04L 29/06* (2006.01)
  *H04L 29/08* (2006.01)
(52) U.S. Cl.
  CPC .............. *H04L 65/60* (2013.01); *H04L 67/10* (2013.01); *H04L 67/42* (2013.01)
(58) Field of Classification Search
  CPC .......... H04L 65/60; H04L 67/10; H04L 67/42
  See application file for complete search history.

(56) References Cited

U.S. PATENT DOCUMENTS

| 2007/0198111 | A1* | 8/2007 | Oetzel | G06F 3/04855 700/94 |
| 2012/0173981 | A1* | 7/2012 | Day | G06F 3/04817 715/719 |
| 2015/0049162 | A1* | 2/2015 | Kurupacheril | H04N 5/23238 348/14.08 |
| 2015/0074698 | A1* | 3/2015 | Pinto | H04N 21/4756 725/14 |

* cited by examiner

*Primary Examiner* — Richard G Keehn
(74) *Attorney, Agent, or Firm* — Weaver Austin Villeneuve & Sampson LLP

(57) ABSTRACT

Techniques are described for providing a media content review timeline to provide viewers more detail on movies, television shows, and other types of media content. Viewers can review media content as it is being played back and a media content review timeline can be generated to provide viewers with a graphical chart of how the media content is reviewed by other viewers during the playback.

18 Claims, 8 Drawing Sheets

MEDIA CONTENT REVIEW TIMELINE

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

Some media content, such as movies, television shows, videos (e.g., content uploaded by users of video streaming sites), and music can be reviewed by customers to provide an evaluation of the media content. Unfortunately, the reviews by the customers may be for the media content as a whole rather than in parts, and therefore, may not provide sufficient information for customers wanting more details of the quality of the media content at different points during the playback of the media content.

DETAILED DESCRIPTION

This disclosure describes techniques for implementing a media content review timeline to provide viewers with more detail regarding the media content. For example, as a viewer watches a movie on a video player, the viewer can select a "like" or "dislike" button multiple times throughout the playback of the media content. The user might select the "like" button during interesting scenes and the "dislike" button during boring scenes of the movie. As a result, the viewer can provide several reviews of the movie, with each review corresponding to different points or parts (e.g., different scenes) of the movie. Data from multiple viewers can be received and a media content review timeline providing scores for the different points or parts of the movie can be generated.

Figure 1:
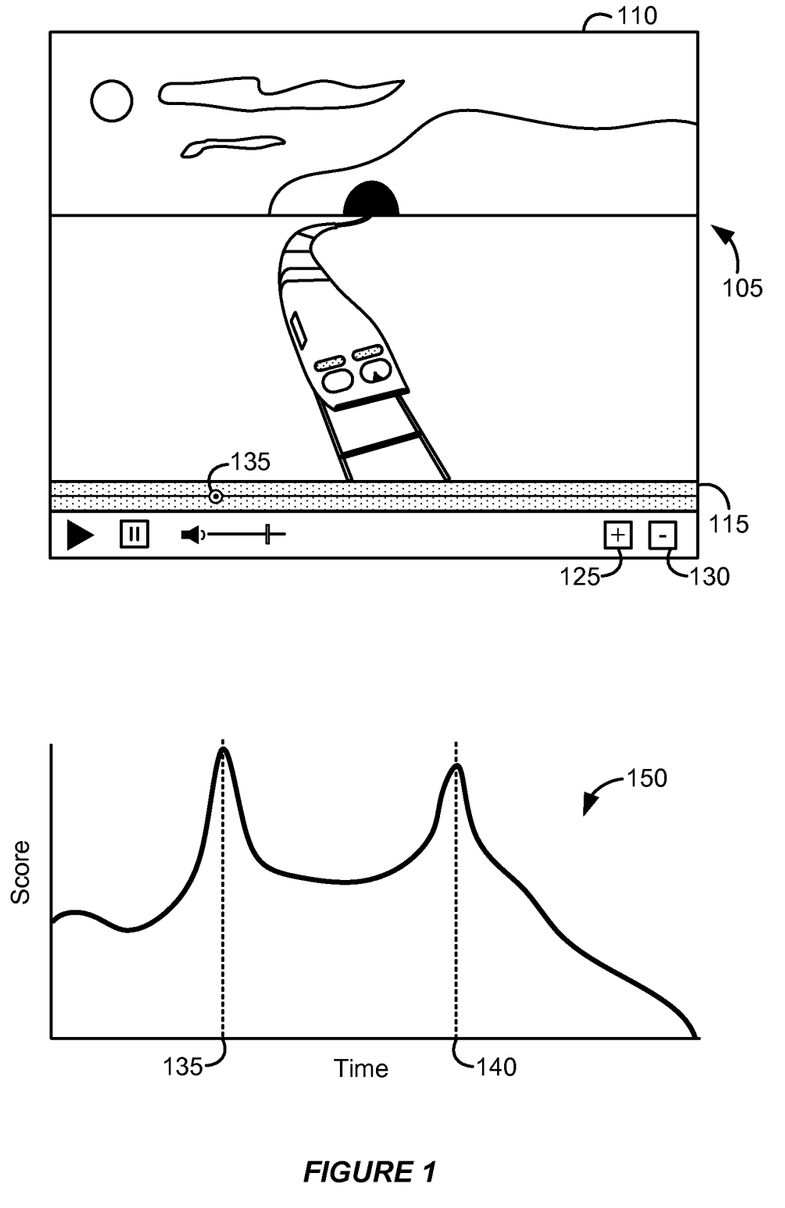
FIG. 1 illustrates an example of a media content review timeline.

FIG. 1 illustrates an example of a media content review timeline. As shown in FIG. 1, a viewer may use video player 105 to watch media content. For example, in FIG. 1, the viewer is watching an episode of Supertrain, a 1979 television drama and adventure series. Video player 105 includes playback timeline 115 providing a progress bar of the playback of the episode with the beginning of playback timeline 115 indicating the start of the playback for the episode, the end of playback timeline 115 indicating the end of the playback for the episode, and scene 110 of the episode occurring at time 135 during the playback of the episode. Video player 105 also includes settings bar 120 with options to pause the episode, resume the episode from pause, and adjust the volume of the playback. Additionally, settings bar 120 includes "like" button 125 and "dislike" button 130. Like button 125 and dislike button 130 may allow for the viewer to provide feedback relating to a portion of the episode during its playback on video player 105.

For example, the viewer might be a fan of action scenes. As the viewer watches the episode, like button 125 can be selected during exciting action scenes, for example, when the train in scene 110 of the episode exits the tunnel fleeing from bandits at time 135. After scene 110 at time 135, the episode might begin several scenes of character development. The viewer might then select dislike button 130 since these scenes lack excitement for the viewer. As a result, the viewer can provide several reviews or other type of feedback evaluating the episode as it is being played back.

Reviews from several viewers can be collected and a media content review timeline can be generated. In FIG. 1, review timeline 150 provides scores for the episode during the timeline of its playback (i.e., for the times indicated in playback timeline 115) based on viewers selecting like button 125 and dislike button 130. The vertical axis of review timeline 150 indicates a score and the horizontal axis of review timeline 150 indicates the time during the playback (e.g., time 135 may be at 58 minutes, 12 seconds). As viewers select like button 125 and dislike button 130, scores may be generated (e.g., based on the ratio of likes-to-dislikes, averaging scores, etc.) providing a review of the episode at different parts (e.g., discrete points or pieces such as scenes) rather than a single score for the episode as a whole. For example, in FIG. 1, time 135 in review timeline 150 has a high score indicating that many viewers selected like button 125 at that point during the playback. Likewise, time 140 in review timeline 150 also has a high score indicating that many viewers selected like button 125 at a later point in the movie. However, the time in between times 135 and time 140 may include scenes that caused many viewers to select dislike button 130, and therefore the score for the parts of the episode between time 135 and time 140 can have a lower score. Likewise, the end of review timeline 150 also indicates a very low score, suggesting that the episode might have an ending that was not enjoyed by the viewers.

As a result, viewers can be provided with review timeline 150 to see how reviews of viewers evaluating the episode vary during playback of the episode. Viewers can then choose to skip parts of the episode to avoid watching the poorly-reviewed parts (i.e., the parts corresponding with a lower score), and therefore, the viewers might enjoy the episode more and be able to watch the parts of the episode that they would likely find interesting.

In some implementations, different types of representations or visualizations other than review timeline 150 may be provided. For example, a sequence of thumbnails of the different scenes of the episode can be generated and ordered in terms of how well the scenes were reviewed. As another example, a particular number of the most well-reviewed scenes can be listed (either graphically with thumbnails or textually described).

Figure 2:
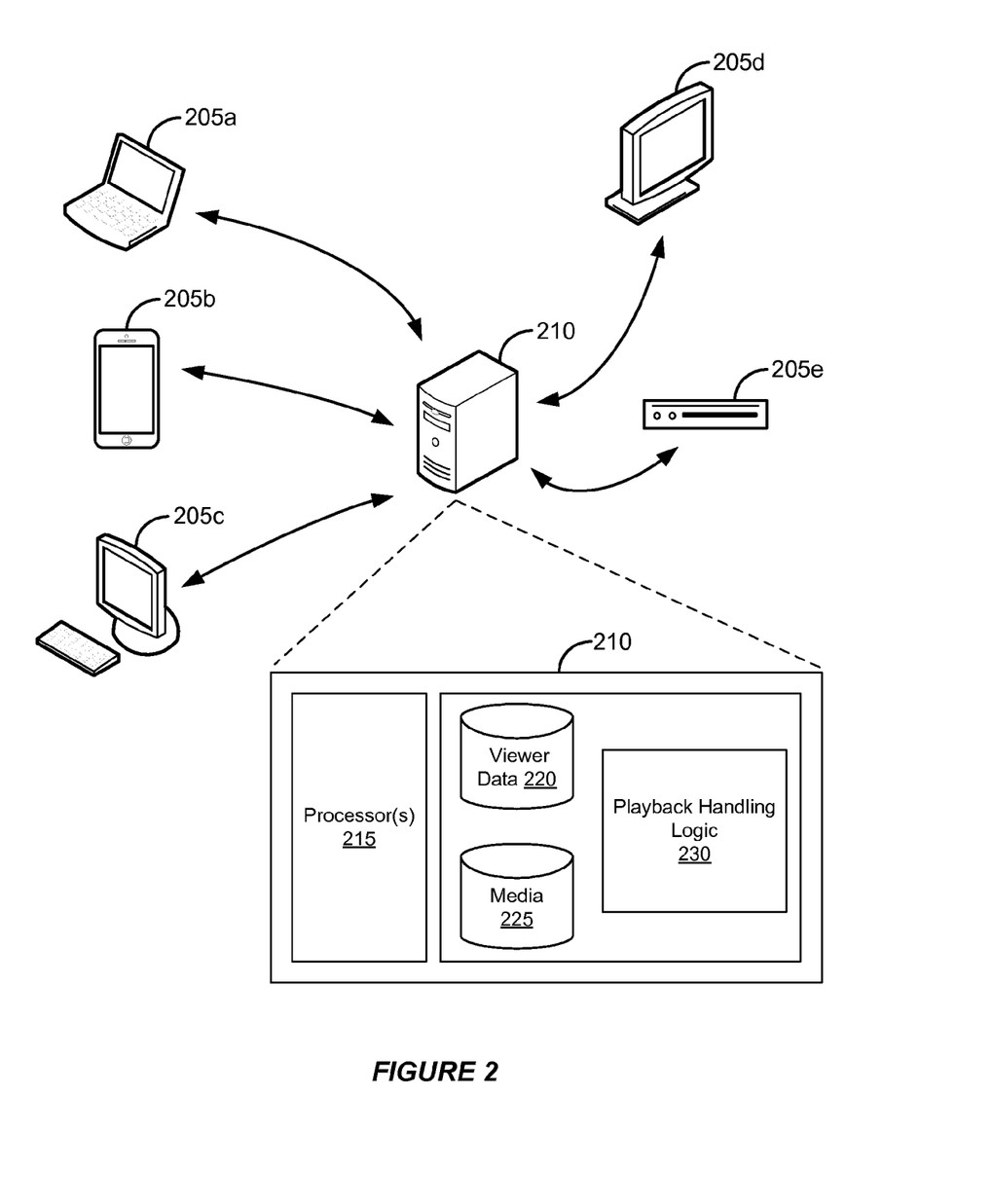
FIG. 2 illustrates an example of a computing environment for providing a media content review timeline.

FIG. 2 illustrates an example of a computing environment for a server used to provide a media content review timeline. The computing environment of FIG. 2 includes media server 210 which can be used to provide media content for playback on devices 205a-e. Device 205a is a laptop computer, device 205b is a smartphone, device 205c is a desktop computer, device 205d is a television, and device 205e is a set-top box. Other types of devices such as tablets, wearable devices (e.g., smart watches), etc. may also be included in the computing environment.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 210 may be part of a content delivery system that conforms to any of a wide variety of architectures. The functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content, including content providers, internet service providers (ISPs), providers of content delivery networks (CDNs), etc. The functionality described herein also may be implemented by one or more of different entities. For example, the functionality to track selections of review indicators can be integrated into a video player under control of one entity, integrated into a separate app from another entity, implemented in an edge server or content server of a CDN, a server of an ISP, etc.

Media server 210 can include various types of logic used to provide media content for playback at devices 205a-e. In FIG. 2, media server 210 includes media content storage 225, viewer data content storage 220, and playback handling logic 230. Media server 210 also can include one or more processors 215, memory, and other hardware for performing the tasks disclosed herein.

Media content storage 225 stores a variety of media content for playback on devices 205a-e, such as episodes of shows, movies, music, digital books, videos (e.g., content uploaded by users of video streaming sites), etc. Additionally, media content storage 225 can store metadata associated with media content, such as the start and end times of scenes (i.e., segments of the media content) of shows and movies.

Viewer data content storage 220 can be a storage mechanism, such as a database, storing review data of viewers. For example, the number of times that like button 125 and dislike button 130 were selected, in addition to when they were selected (i.e., when within playback timeline 115), can be stored in viewer data 220. Other types of review data, such as a numerical scores (e.g., viewers may provide a score of 1-10 rather than like or dislike) and usernames also may be stored. As another example, a selection of like button 125 may provide a score of 10 and a selection of dislike button 130 may provide a score of 0. The total scores of multiple viewers in the aggregate may also be stored. That is, data points corresponding to timeline 150 in FIG. 1 can also be stored in viewer data content storage 220, for example, by averaging the scores provided by review data received by media server 210.

Playback handling logic 230 may provide media content from media content storage 225 and receive review data from devices 205a-e (e.g., selections of like button 125 and dislike button 130). For example, playback handling logic 230 may stream selected media content from media content storage 225 and receive indications of selections of like button 125 and dislike button 130 during the playback of the streamed media content. The received indications of selections of like button 125 and dislike button 130 can cause media server 210 to add new data or modify existing data in viewer data content storage 220. Additionally, the time during the playback (e.g., 1 hour, 23 minutes, 15 seconds) can also be provided and stored. In other implementations, other parts of the playback can be identified, for example, a scene (e.g., scene number 23) that was played when like button 125 or dislike button 130 were selected.

Figure 3:
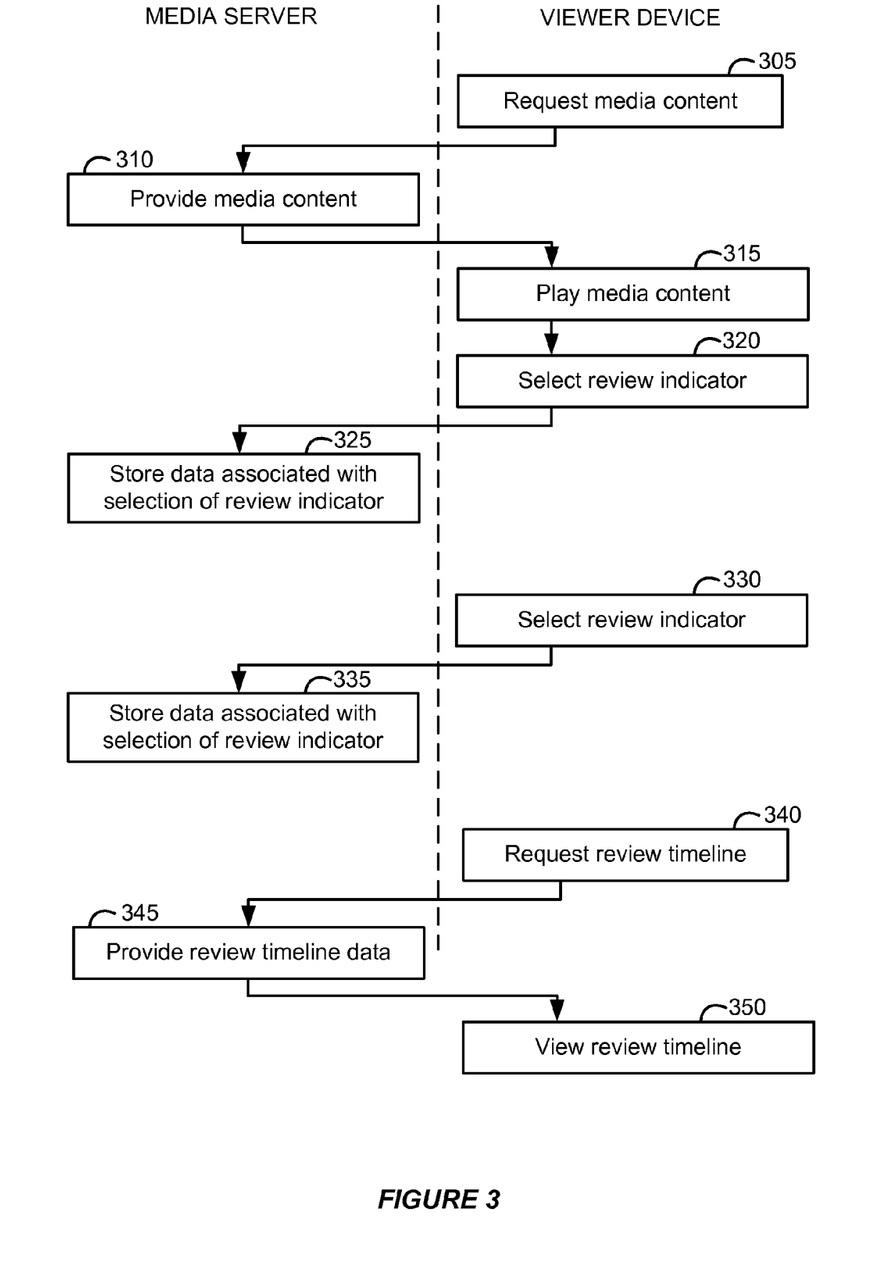
FIG. 3 is a flowchart illustrating providing a media content review timeline.

A specific implementation will now be described with reference to the computing environment of FIG. 2 and the flow diagram of FIG. 3. In the depicted implementation, a viewer selects media content for playback on a device (e.g., one of devices 205a-e), for example, by selecting an episode of a television show for playback from a video streaming service, and therefore, request the particular episode from media server 210 (305). Media server 210 receives the request, retrieves the appropriate data from media content storage 225, and provides the episode for playback on the device (310). The device receives the stream of the media content and begins playing it (315). The episode can be provided in whole, or in parts. For example, the episode can be streamed from media server 210 in parts or in real-time, or the entire media content can be downloaded or otherwise provided to the device before playback begins.

While watching the media content, the viewer using the device can provide a review by selecting a review indicator such as like button 125 or dislike button 130 in FIG. 1 (320). As a result, review data can be generated and provided to media server 210 and stored in viewer data content storage 220 (325). For example, the review data can indicate a score (e.g., a like or dislike) and the time during the playback of the media content that like button 125 or dislike button 130 was selected. As another example, the viewer can select a number between 1 to 10, select various graphical icons (e.g., different emoji might reflect different numerical scores), provide a textual review that can be analyzed with sentiment analysis to generate a numerical score, or other techniques to indicate an evaluation of a portion of the episode. A score can be either generated by the device (e.g., by a video player software program) or determined by media server 210 based on the review data (e.g., media server 210 can determine the score by analyzing a textual review). As previously discussed, the review data also may be aggregated with existing aggregated review data from prior viewer-provided review data. For example, the number of times like button 125 and dislike button 130 were previously selected may be updated based on the selection of the review indicator as indicated by the review data. As another example, an average score for the portion of the media content being reviewed can be updated with inclusion of the new score indicated in the review data.

Next, the viewer using the device can select a review indicator again (330). For example, the viewer may select dislike button 130 to indicate that the portion of the media content being played back at the device is not enjoyable to the viewer. As a result, new review data may be generated, received by media server 210, and stored in viewer data content storage 220 and/or used to update the data in viewer data content storage 220 (325). Multiple viewers may select review indicators at different times as they also watch the episode.

Eventually, a viewer using a device can request to view a media content review timeline derived from the review data (340). For example, review timeline 150 in FIG. 1 can be presented to a viewer by selecting a button on video player 110. When media server 210 receives the request, media content review timeline data for the device to render the media content review timeline can be provided to the device (345). For example, media server 210 may provide data points for the device to generate a visual representation of review timeline 150. In some implementations, media server 210 can generate an image with the scores plotted with time as in review timeline 150 and provide the image to the device. As a result, the media content review timeline can be viewed on the device (350).

The scores may be associated with different lengths of the playback of the media content. In some implementations, each scene of the media content can have its own score based on the scores submitted with the review data by viewers as they are watching the scene. For example, at any time when a scene is being played and a viewer selects a review indicator (e.g., like button 125), the score may be for the entire scene regardless of when the review indicator was selected during the playback of the scene. Review timeline 150 may then be presented by having an average score for each scene. In other implementations, each point in review timeline 150 may have a score. That is, when a review indicator is selected, the time indicated in playback timeline 150 in FIG. 1 can be associated with the score. As a result, different points within the same scene can have different scores in review timeline 150.

Figures 4A, 4B:
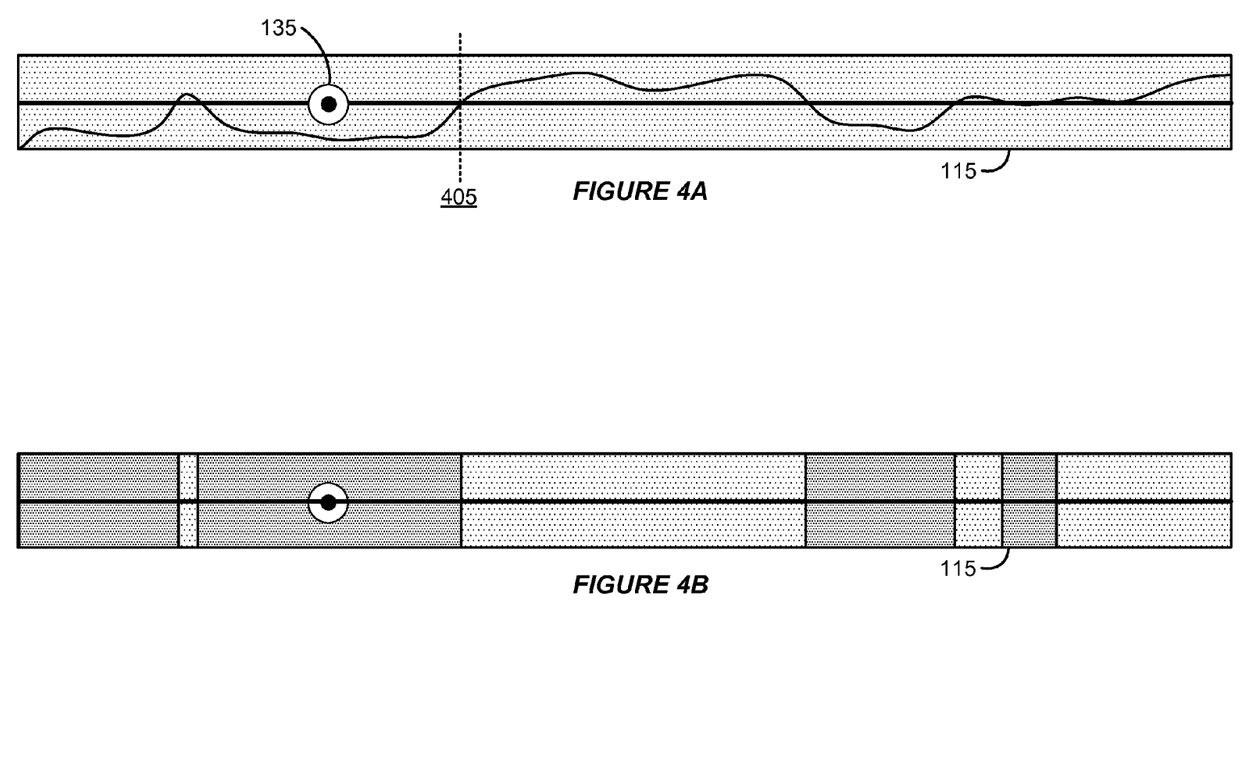
FIGS. 4A-C illustrate examples of visual representations of a media content review timeline.
Figure 4C:
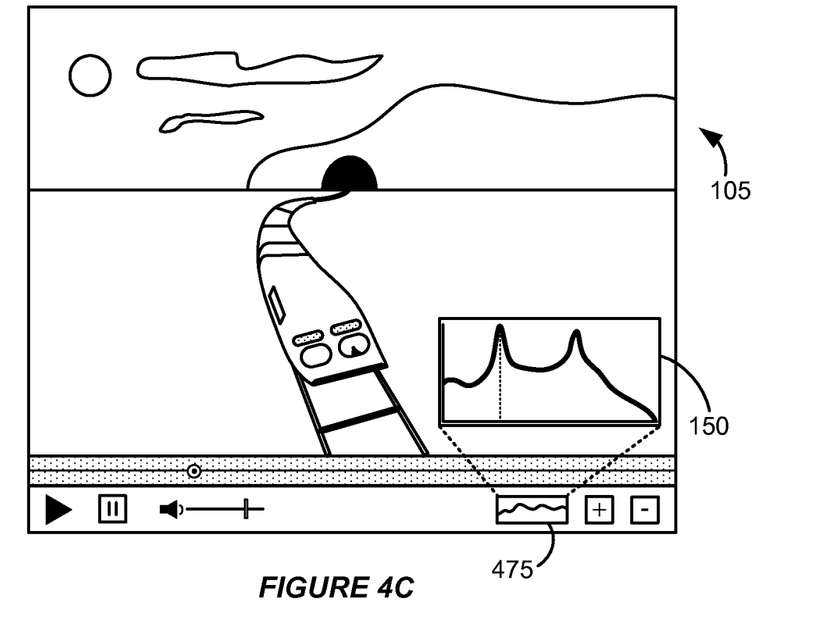

Review timeline 150 for media content can be presented in a variety of different ways. FIGS. 4A-C illustrate examples of visual representations of a media content review timeline. In FIG. 4A, review timeline 150 can be displayed with playback timeline 115. For example, in FIG. 4A, review timeline 150 and playback timeline 115 may be displayed together (e.g., one overlaid upon another). As a result, the viewer can see by the position of the playback indicator at time 135 of playback timeline 115 that the playback of the media content is currently at a lowly-reviewed (i.e., relatively unpopular) portion of the media content, and therefore, can click at a later time (e.g., time 405) to skip to a beginning of a better reviewed (i.e., relatively popular) portion.

In FIG. 4B, data from review timeline 150 can be used to indicate portions of playback timeline 115 corresponding to well-reviewed or poorly-reviewed parts of the media content. For example, in FIG. 4B, the times when the media content has a score higher than the average of the lowest possible score and the highest possible score (e.g., a 5 out of a score of 0-10) can be used to indicate that the media content is at a well-reviewed portion and the time when the media content has a score lower than the average can be used to indicate that the media content is at a poorly-reviewed portion of the media content. In one implementation, playback timeline 115 may be portrayed in different colors to indicate the well-reviewed and poorly-reviewed portions (e.g., well-reviewed portions may be in green and poorly-reviewed portions may be in red). In FIG. 4B, the two different shadings represent well-reviewed and poorly-reviewed portions of the media content.

In some implementations, the viewer may be able to adjust the score threshold of what is considered to be a well-reviewed or poorly-reviewed portion of the media content to tailor the review timeline to the viewer's belief of what is a well-reviewed or poorly-reviewed portion. For example, the viewer may select in video player 105 an adjustment to the visual representation of the scores by indicating that a well-reviewed portion should have a score of 7.5 or higher rather than a score of 5 or higher. In some implementations, the viewer can select multiple categories of scores, for example, by specifying different score ranges (e.g., 0-3, 3.1-7, and 7.1-10 can be three different score ranges) that can be distinguished from one another.

In FIG. 4C, review timeline indicator 475 is provided by video player 110 and can be selected by a viewer to pop-up a new window or interface providing review timeline 150. The viewer may then be able to see how the media content has been reviewed during its playback, see where the playback is currently at with respect to review timeline 150, and select (e.g., click) on review timeline 150 and cause video player 105 to playback the episode at another point corresponding to the time selected on review timeline 150 in FIG. 4C.

In some scenarios, different devices may be used to watch media content. For example, one viewer may watch a movie on a smartphone and another viewer may watch the same movie on a television. However, the different devices used to watch the movie have different characteristics (e.g., screen size, number of speakers, etc.). As a result, the two viewers may have different viewing experiences that can affect how they review portions of the movie. For example, if the movie is an action movie with extravagant special effects and music, the viewer watching the movie from the television may have a more pleasurable experience due to the capabilities of the television portraying the special effects and playing the music, and therefore, may be likely to review portions of the movie highly. By contrast, the viewer watching the movie with the smartphone may not appreciate the special effects and music due to the limitations of the smartphone (e.g., a smaller screen and lower quality speakers than a television), and therefore, may be likely to review portions of the movie lower than the viewer using the television.

In some implementations, as review data is received, different sets of data providing review timelines may be kept based on characteristics of the viewer device. For example, devices with screens in particular size ranges, devices that are streaming the media content at a certain video quality level (e.g., standard definition, 720p, 1080p, etc.) or audio quality level (e.g., a particular bitrate), certain types of devices (e.g., television, smartphone, tablet, phablet, etc.) can be provided a review timeline for that class of devices. For example, smartphones may have a review timeline based on separate data than televisions. As a result, if a viewer is watching the movie on a smartphone and wants to look at the review timeline for the movie, one based off of review data from other viewers watching the movie on smartphones may be provided. As another example, if a viewer is watching a television show in standard definition, regardless of the type of device, a review timeline based on review data from other viewers watching the movie in standard definition may be provided. If another viewer is watching the same episode of the same television show in 720p, then another review timeline based on review data from other viewers watching the movie in 720p may be provided.

Figure 5:
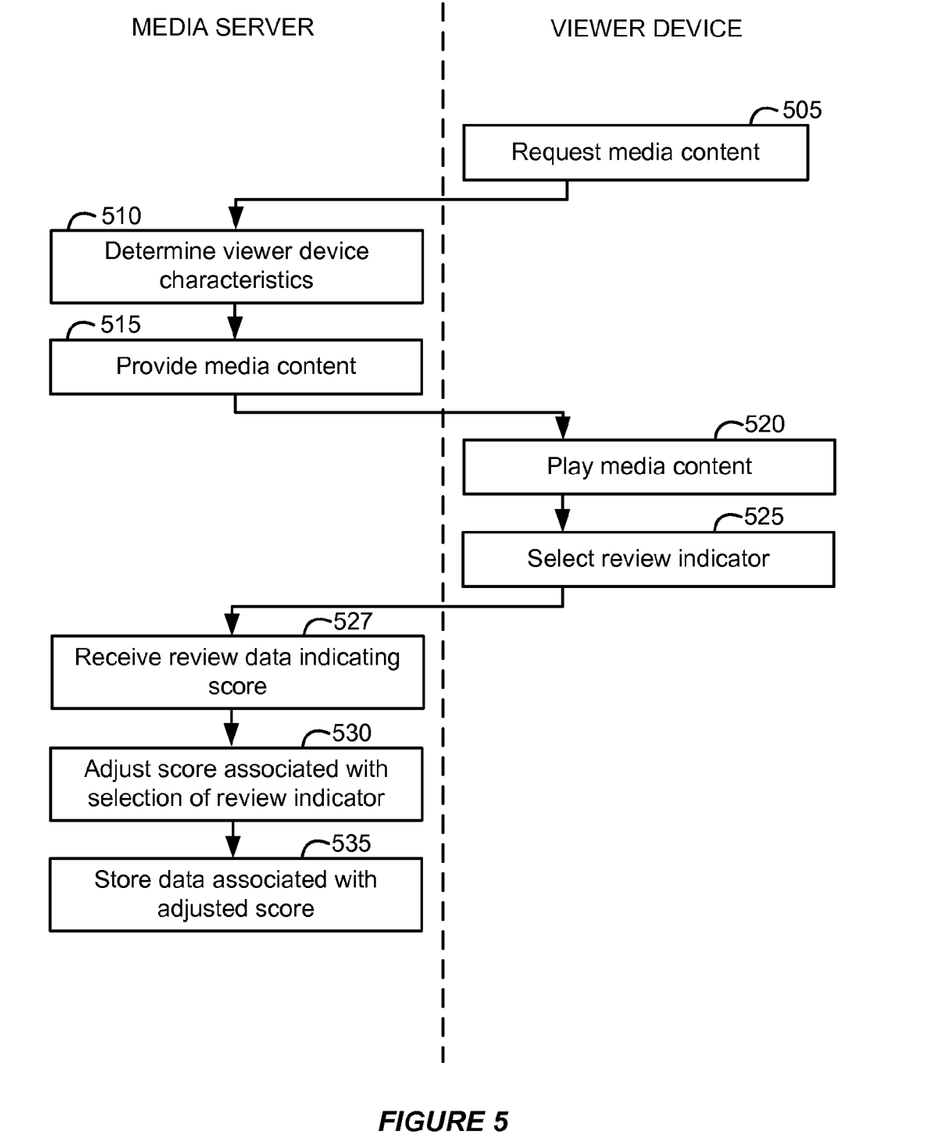
FIG. 5 is a flowchart illustrating adjusting a score.

In some implementations, scores indicated by review data may be adjusted based on characteristics of the device. FIG. 5 is a flowchart illustrating an operation of a server adjusting a score. In FIG. 5, media content can be requested by a viewer device (505). As previously discussed, the viewer device may request for media server 210 to stream media content for playback at the viewer device. Media server 210 can determine characteristics of the viewer device to determine how to stream the requested media content (510). For example, media server 210 can determine the above-described characteristics (e.g., screen size, audio quality, video quality, type of device), as well as geographic location of the viewer device, the speed of the internet connection or network connections used by the device to communicate with media server 210, operating system of the device, or any other characteristic. Media server 210 provides the stream of the media content to the viewer device (515).

The viewer device can play the streamed media content (520). As previously discussed, a review indicator can be selected (525). Review data can be generated and received by media server 210 (527).

Media server 210 can adjust the value of the score indicated by the review data generated by the selection of a review indicator (e.g., like button 125 or dislike button 130) (530). For example, three viewers might be watching the same movie on three different devices: one user might be watching on a smartphone, a second user might be watching on a 30-inch television, and a third user might be watching on a 62-inch television. The 30-inch television may be designated by media server 210 as a "baseline" or reference device that review data from other types of devices should be adjusted to. For example, if watching an action movie, scores provided by review data generated on smartphones may be adjusted upward (e.g., a score of 3.0 should be adjusted to 3.5, a like should be a score of 11.0 instead of 10, etc.). If the action movie is watched on the 62-inch television, then the score may be adjusted downward. Scores from the 30-inch television may remain unchanged. As a result, different devices, or groupings of devices, can be designated by media server 210 to have their provided scores adjusted to account for how different viewing experiences may affect the review timeline. The score may then be stored and/or used to update the current data in viewer data content storage 220 (535).

In some implementations, some media content may be able to be provided in different formats. For example, a movie can be provided in a three-dimensional (3D) version or a two-dimensional (2D) version. Scores provided by viewer devices watching different formats of the same media content can also be adjusted similar to the example of FIG. 5. For example, a viewer device watching a 3D version of a movie can have downward-adjusted scores and a 2D version of the movie can be unadjusted.

Figure 6:
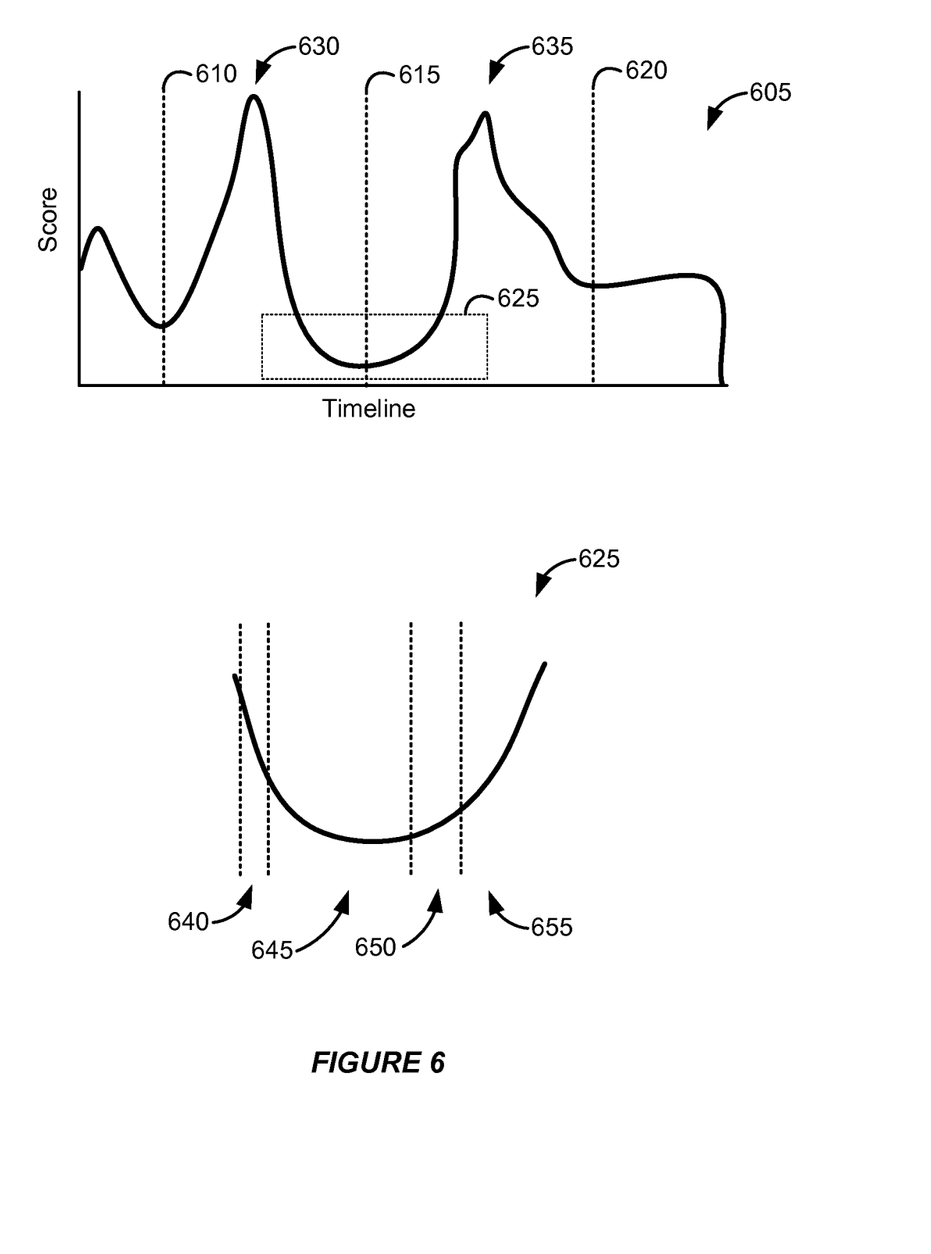
FIG. 6 is an example of providing an advertisement based on a media content review timeline.

Review data can also be used to provide advertisements during the streaming of media content to generate revenue for the provider of the media content. FIG. 6 is an example of providing an advertisement based on a media content review timeline. In FIG. 6, review timeline 605 includes times 610, 615, and 620 associated with low scores. In some implementations, the streaming of the media content to the user device can be interrupted with advertisements based on when times 610, 615, and 620 occur.

For example, in FIG. 6, time 615 occurs during time range 625, which occurs between two highly-reviewed portions of the media content at times 630 and 635. Time range 625 may include four scenes 640, 645, 650, and 655. In some implementations, advertisements may be included in between two of scenes 640, 645, 650, and 655, after time 630 and before time 635 such that the advertisements may occur during a poorly-reviewed portion of the media content and not interfere with the playback during well-reviewed portions.

In some implementations, if a particular time range of review timeline 605 is within a threshold score range and threshold time range (e.g., portion 605 being 10 minutes or longer and with each point during portion 605 having a score of 3 or lower), then advertisements may be provided during portion 605 by interrupting playback of scenes of the media content with the advertisements during that time range. For example, advertisements may be provided between scene 645 and 650. In some implementations, the advertisements may be provided within a threshold time range following scene 640 to maintain viewer attention.

Figure 7:
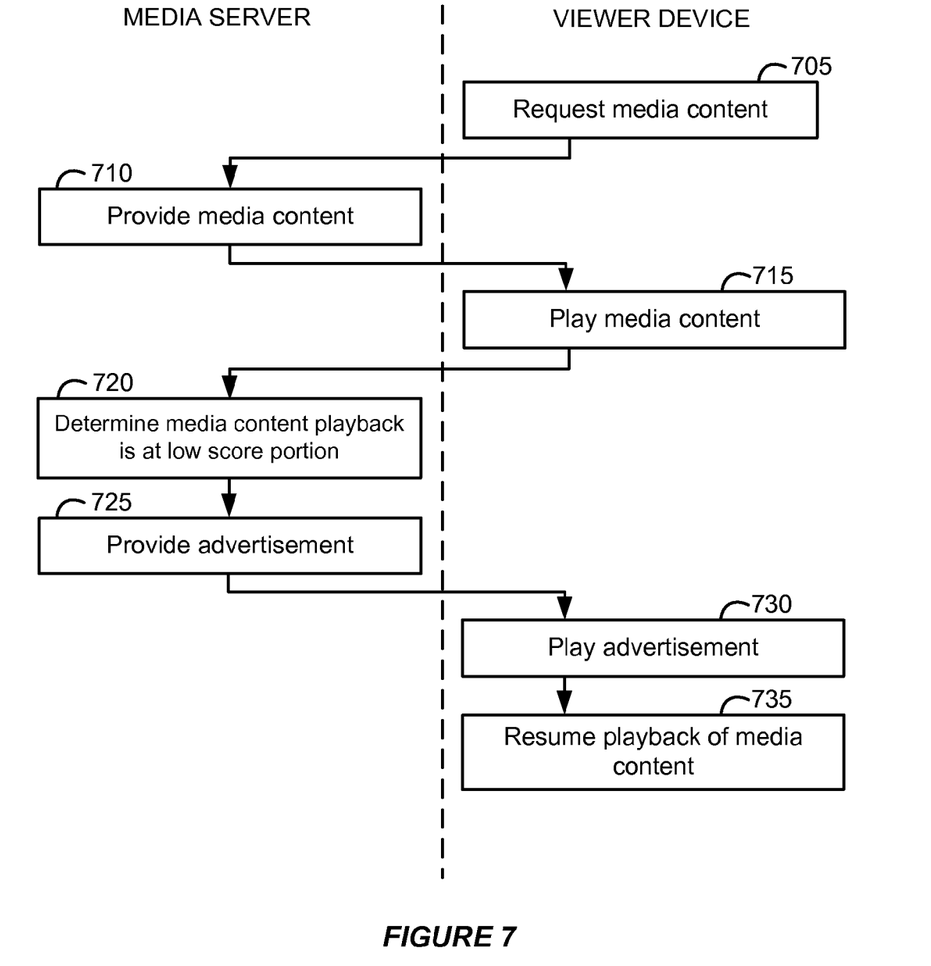
FIG. 7 is a flowchart illustrating providing an advertisement based on a media content review timeline.

FIG. 7 is a flowchart illustrating an operation of a server providing an advertisement based on a media content review timeline. In FIG. 7, a viewer device can request to view media content (705). Media server 210 receives the request and streams the requested media content to the viewer device (710). The viewer device can then begin playing the media content (715). Since media server 210 is streaming the media content to the viewer device, it may know the time within the playback of the media content that the viewer device is at (e.g., 1 hour, 23 minutes, 12 seconds). As a result, media server 210 can determine that the time within the playback that the viewer device is at may correspond to a lowly-reviewed portion of the review timeline based on the data in viewer data content storage 220 (i.e., the review data provided by other viewer devices that previously watched the same media content) (720). In another implementation, media server 210 may stream the portion of the media content before advertisements, stream the advertisements at a time corresponding to the lowly-reviewed portion, and then stream the portion of the media content to be played following the advertisements. Media server 210 can then provide one or more advertisements (e.g., video commercials, still images, etc.) to the viewer device (725). The playback of the media content on the viewer device can be paused and the advertisements may then be played on the viewer device (730). After the advertisements are done, the playback of the media content can be resumed (735). For example, media server 210 may resume streaming the media content to the viewer device.

In some implementations, the review data may also be generated separately from the viewer's selection of review indicators. For example, a viewer may wear a wearable device, such as a smart watch, which includes a heartbeat sensor. The viewer's heartbeat may be measured while the media content is played and can be used to generate review data with scores. The score provided by the review timeline can be associated with the heartbeat rate of users, and therefore, a higher score may indicate that viewers experienced a high heartbeat rate during those portions of the media content. Other physical characteristics of the viewer, such as sweat, movement, eye movement, etc. can also be used to generate review data to provide scores. In some implementations, the viewer can select a review indicator (e.g., like button 125 in FIG. 1) and physical characteristics of the viewer at or around the time that the review indicator was selected can also be collected to generate a score based on both the selection of the review indicator and the detected physical characteristics of the viewer. For example, a viewer who selects a score of 10 out of 10 and is detected as having an elevated heartbeat rate (e.g., above a threshold rate) or a heartbeat rate that has increased (e.g., a percentage increase) can have their score adjusted to 9.5 by media server 210, but a viewer who selects a score of 10 out of 10 and is detected as having a non-elevated heartbeat rate can have their score unadjusted.

In some implementations, the review data can also be based on the characteristics of the playback of the media content on video player 105. For example, a viewer might lower the volume of the audio track of the playback of media content, reduce the size of video player 105 (e.g., by resizing a window of video player 105 on a desktop computer), open new tabs on a browser (e.g., when watching the media content on a webpage of a video streaming service) and go to a website when a scene is uninteresting to the viewer. As a result, these types of adjustments to the environment of the playback of the media content being streamed can be considered when generating review data. For example, when watching a scene and the viewer reduces the volume and subsequently increases the volume following the scene, review data may be generated indicating that this occurred (suggesting that the scene with the reduced volume is lowly reviewed, or very exciting but too loud), and therefore, media server 210 may modify data in viewer data content storage 220 similar to previous examples.

In some implementations, media server 210 can determine scenes that are within a threshold score range and then generate a webpage including a video clip of the scene for viewers to watch. For example, a movie may include a particularly popular scene that can be identified by having a very high score. To increase viewer engagement with a website, scenes that have scores in a review timeline above a particular score (e.g., above a 9 out of 10) can have a webpage generated including a video clip of the scene, a form for viewers to fill out to provide comments, and other community-related features. In another implementation, a preview of the media content can be generated by allowing a quick playback of the episode by providing the scenes that are within the threshold score range one-after-another in series.

In some implementations, different review timelines can be provided for different aspects of the playback of the media content. For example, viewers may be able to separately rate the audio soundtrack, acting, directing, cinematography, subtitles, etc. As a result, multiple different types of review timelines may be available. Any of the aforementioned techniques may be applied for the different types of review timelines.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method, comprising:

receiving, by a media server, a first request from a first client device for media content, the media content having been previously generated;

streaming, by the media server, the media content to the first client device;

receiving, by the media server, first review data from the first client device, the first review data representing a first score associated with a first portion of the media content;

receiving, by the media server, second review data from the first client device, the second review data representing a second score associated with a second portion of the media content;

generating, by the media server, media content review timeline data of the media content, the review timeline data providing a first aggregated score of the first portion of the media content based in part on the first review data from the first client device, and the review timeline data providing a second aggregated score of the second portion of the media content based in part on the second review data from the first client device;

receiving, by the media server, a second request from a second client device for the media content, the second request being received by the media server at a later time than the first request;

streaming, by the media server, the media content to the second client device;

receiving, by the media server, third review data from the second client device, the third review data representing a third score associated with the first portion of the media content corresponding to the first review data from the first client device;

receiving, by the media server, fourth review data from the second client device, the fourth review data representing a fourth score associated with the second portion of the media content corresponding to the second review data from the first client device;

updating, by the media server, the media content review timeline data of the media content, the review timeline data providing a first aggregated score of the first portion of the media content based in part on the first review data from the first client device and the third review data from the second client device, and the review timeline data providing a second aggregated score of the second portion of the media content based in part on the second review data from the first client device and the fourth review data from the second client device;

receiving, by the media server, a third request from a third client device for the media content, the third request being received by the media server at a later time than the first request and the second request;

streaming, by the media server, the media content to the third client device;

determining classifications of the first client device, the second client device, and the third client device based on at least one of screen size, streaming video quality level, streaming audio quality level, or device type, wherein the first client device and third client device are determined to share at least one classification, and the second client device and third client device are determined to not share a classification;

determining a subset of the review timeline data for the media content based on the classifications of the first client device, the second client device, and the third client device, wherein the subset of the review timeline data includes the first review data and the second review data from the first client device, and does not include the third review data and the fourth review data from the second client device; and providing, by the media server, a visual representation of the subset of the review timeline data in conjunction with a playback timeline of a video player to the third client device.

2. The method of claim 1, wherein the first portion is a first scene of the media content, the second portion is a second scene of the media content, the first scene at a different time than the second scene.

3. The method of claim 1, wherein the media content review timeline data indicates aggregated scores for points in time corresponding to selections of review indicators on the client devices during a playback of the media content.

4. The method of claim 1, further comprising:
determining that the streaming of the media content to the first client device is within a time period of a playback of the media content, and that the scores associated with the time period are within a threshold range; and
streaming, by the media server, an advertisement based on the determination that the streaming of the media content is within the time period of the playback of the media content, and that the scores associated with the time period are within the threshold range.

5. A computing device, comprising:
one or more processors and memory configured to:
receive review data from each of a first client device and a second client device, the review data from the first and second client devices representing corresponding evaluations of portions of media content at corresponding points during playback of the media content by the first and second client devices, the media content having been previously generated; and
generate review timeline data indicating scores based on the evaluations of the portions of the media content at the points during the playback of the media content;
receive a request from a third client device for the media content;
stream the media content to the third client device;
determine classifications for each of the first client device, the second client device, and the third client device;
determine a subset of the review timeline data based on the classifications of the first client device, the second client device, and the third client device;
provide a visual representation of the subset of the review timeline data in conjunction with a playback timeline of a video player to the third client device.

6. The computing device of claim 5, wherein the review timeline data includes a first score associated with a first portion of the media content, the review timeline data includes a second score associated with a second portion of the media content, and wherein the first portion occurs at a first point during the playback of the media content, the second portion occurs at a second point during the playback of the media content, the first point occurring at a different time than the second point during the playback of the media content.

7. The computing device of claim 5, the one or more processors and memory further configured to:
receive data indicating a selection of a portion of a visual representation of the subset of the review timeline data; and
provide playback of the media content at a time corresponding to the selected portion of the visual representation.

8. The computing device of claim 5, wherein the review data includes a first review data received from the first client device indicating a first score, and the one or more processors and memory are further configured to:
adjust the first score based on physical characteristics of the first client device.

9. The computing device of claim 5, wherein the review data includes a first review data associated with a selection of a review indicator on a video player associated with the playback of the media content on the first client device, and the review data also includes a second review data associated with detected physical characteristics of a user of the first client device.

10. The computing device of claim 9, wherein a score represented by the selection of the review indicator is adjusted based on the detection of the physical characteristics of the user of the first client device.

11. The computing device of claim 5, the one or more processors and memory further configured to:
provide one or more advertisements based on the subset of the review timeline data.

12. A computer program product comprising one or more non-transitory computer-readable media having computer program instructions stored therein, the computer program instructions being configured such that, when executed by one or more computing devices, the computer program instructions cause the one or more computing devices to:
receive review data from each of a first client device and second client device, the review data from the first and second client devices representing corresponding evaluations of portions of media content at corresponding points during playback of the media content by the first and second client devices, the media content having been previously generated; and
generate review timeline data indicating scores based on the evaluations of the portions of the media content at the points during the playback of the media content;
receive a request from a third client device for the media content;
stream the media content to the third client device;
determine classifications of the first client device, second client device, and third client device;
determine a subset of the review timeline data for the media content based on the classifications of the first client device, the second client device, and the third client device;
provide a visual representation of the subset of the review timeline data in conjunction with a playback timeline of a video player to the third client device.

13. The computer program product of claim 12, wherein the review timeline data includes a first score associated with a first portion of the media content, the review timeline data includes a second score associated with a second portion of the media content, and wherein the first portion occurs at a first point during the playback of the media content, the second portion occurs at a second point during the playback of the media content, the first point occurring at a different time than the second point during the playback of the media content.

14. The computer program product of claim 13, wherein the computer program instructions further cause the one or more computing devices:
receive data indicating a selection of a portion of a visual representation of the subset of the review timeline data; and
provide playback of the media content at a time corresponding to the selected portion of the visual representation.

15. The computer program product of claim 12, wherein the review data includes a first review data received from the first client device indicating a first score, and the first score is adjusted based on physical characteristics of the first client device.

16. The computer program product of claim 12, wherein the review data includes a first review data associated with a selection of a review indicator on a video player associated with the playback of the media content on the first client device, and the review data also includes a second review data associated with detected physical characteristics of a user of the first client device.

17. The computer program product of claim 16, wherein a score represented by the selection of the review indicator is adjusted by the detection of the physical characteristics of the user of the first client device.

18. The computer program product of claim 12, wherein the computer program instructions further cause the one or more computing devices to:

provide one or more advertisements based on the subset of the review timeline data.

* * * * *